No. 853,850. PATENTED MAY 14, 1907.
G. WOODALL.
AUTOMATIC CELLAR DRAIN.
APPLICATION FILED JUNE 2, 1906.
2 SHEETS—SHEET 1.
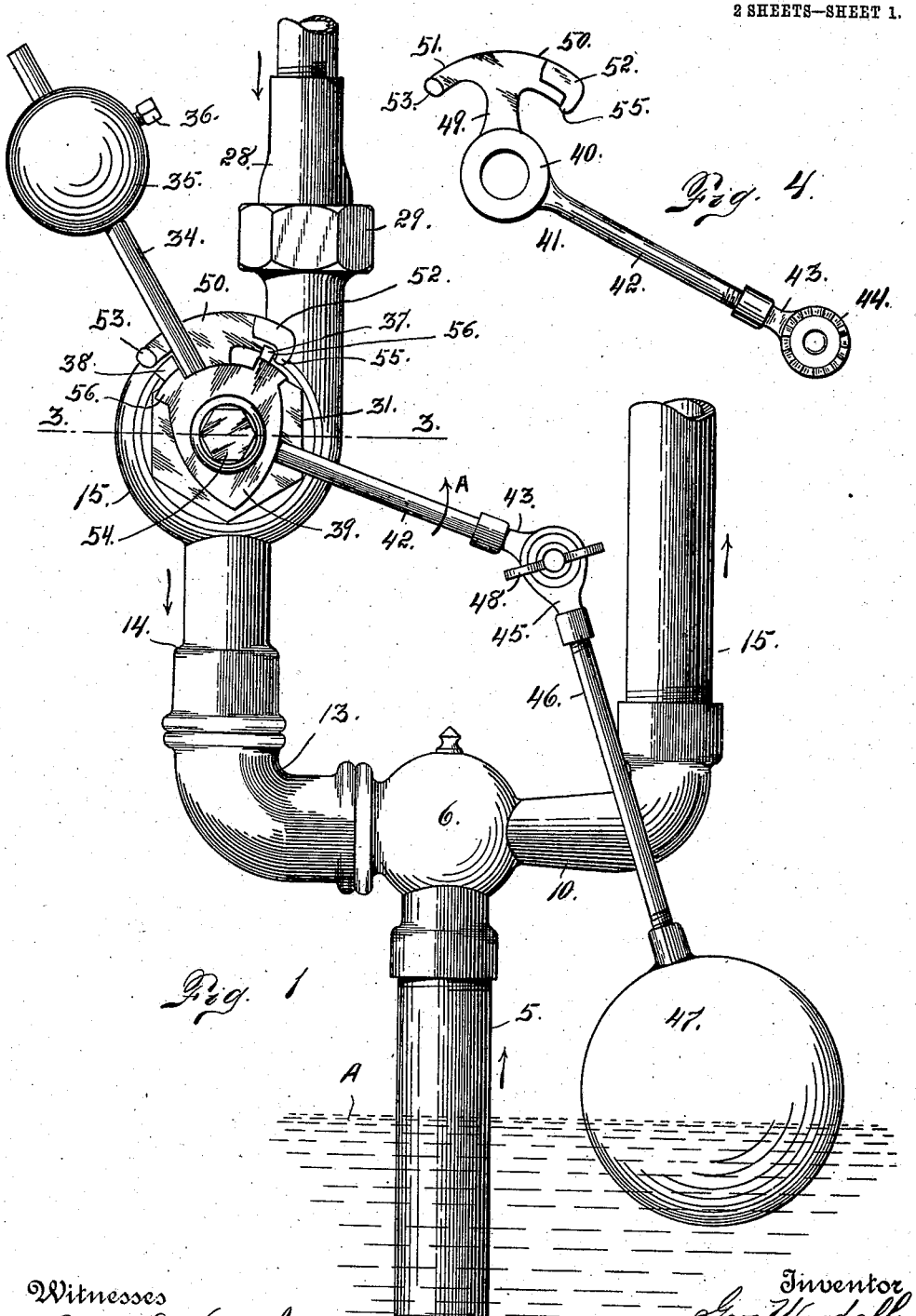

No. 853,850. PATENTED MAY 14, 1907.
G. WOODALL.
AUTOMATIC CELLAR DRAIN.
APPLICATION FILED JUNE 2, 1906.
2 SHEETS—SHEET 2.
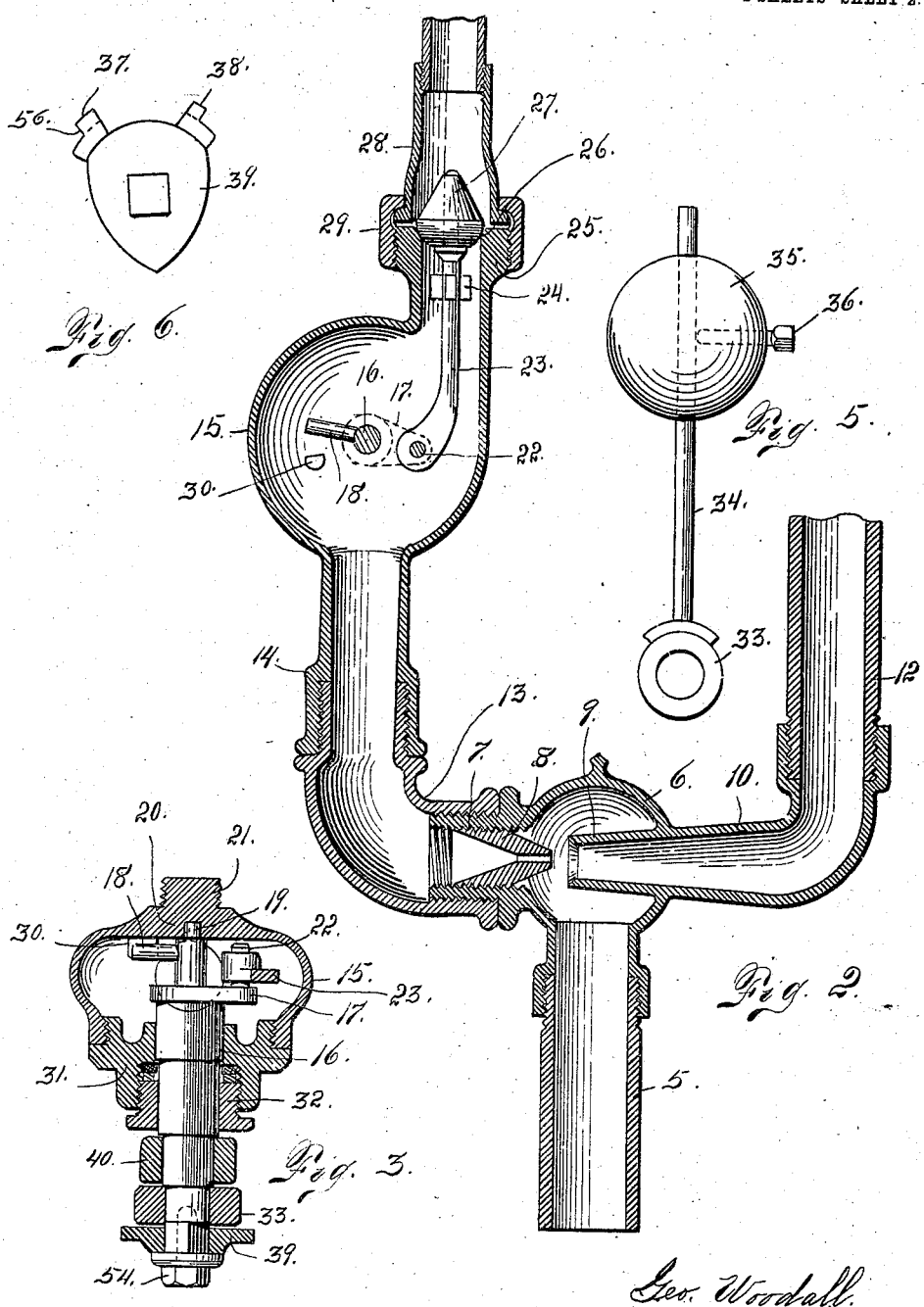

UNITED STATES PATENT OFFICE.

GEORGE WOODALL, OF FLUSHING, NEW YORK.

AUTOMATIC CELLAR-DRAIN.

No. 853,850.　　　　　Specification of Letters Patent.　　　　Patented May 14, 1907.

Application filed June 2, 1906. Serial No. 319,874.

*To all whom it may concern:*

Be it known that I, GEORGE WOODALL, a citizen of the United States, residing at Flushing, Long Island, in the county of Queens and State of New York, have invented certain new and useful Improvements in Automatic Cellar-Drains; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cellar drains which operate on the ejector principle and in which a float is employed to open a valve in order to allow the fluid (water or steam) to pass through the ejector and create the necessary suction for automatically draining the cellar or other cavity or receptacle from which it is desired to remove the accumulating water.

The distinctive feature of my improvement, consists in a construction whereby when the water attains a predetermined level, the valve for controlling the fluid which acts on the ejector, is opened to its full limit or capacity, this opening movement being accomplished practically instantaneously. This is an important feature in a construction of this class.

The invention will be better understood by reference to the accompanying drawing in which is illustrated an embodiment thereof.

In this drawing, Figure 1 is a side elevation of a cellar drain equipped with my improvements. Fig. 2 is a vertical section of the same. Fig. 3 is a section taken on the line 3—3 Fig. 1. Fig. 4 is a detail view of the trip lever. Fig. 5 is a similar view of the ball lever or weighted arm. Fig. 6 is a detail view of the trip socket viewed from a direction opposite the view in Fig. 1.

The same reference characters indicate the same parts in all the views.

Let the numeral 5 designate the suction pipe whose lower extremity is submerged in the water A to be removed. The upper extremity of this pipe is connected with a globular casing 6. One extremity of the casing 6 is provided with an interiorly threaded nipple 7 into which is screwed the ejector nozzle 8 whose reduced extremity enters the casing 6. Directly in front of this extremity is the interiorly protruding part 9 of the discharge pipe member 10 which as shown in the drawing is formed integral with the casing 6. Into the upwardly turned extremity of the member 10 is screwed an upright member 12 through which the water taken from the cellar passes and is finally discharged at any desired point. The nipple 7 of the casing 6 is also exteriorly threaded and upon it is screwed on eextremity of an elbow 13 whose opposite extremity is connected with the upright member 14 to whose upper extremity is connected a circular casing 15 into which protrudes a spindle 16. This extremity of the spindle is provided with oppositely projecting crank arms 17 and 18. The inner extremity of the spindle is journaled as shown at 19, in the reinforced part 20 of the casing. This casing is provided with a threaded projection 21 whereby it may be connected with any suitable stationary support for the apparatus. The arm 17 of the spindle 16 is pivotally connected as shown at 22 with the lower extremity of a valve stem 23 which is provided with guides 24 mounted on the valve stem in a fluid inlet pipe 25 whose upper extremity is provided with a seat 26 for the valve 27. Just above this valve seat, a supply pipe 28 is connected with the pipe 25 by a coupling 29.

The arm 18 of the spindle 16 projects into the path of a stop 30 located within the casing 15. The function of this stop is to limit the opening movement of the valve 27 when the latter is actuated as hereinafter explained.

The spindle 16 passes through a screw cap 31 with which the casing 15 is provided. To this cap is attached a stuffing box 32 forming a fluid tight joint around the spindle where it leaves the casing. Beyond this stuffing box is the eye 40 of a trip lever 41. This eye is loosely mounted on the spindle. The trip lever is provided with an arm 42 whose extremity remote from the eye is provided with a member 43 having a ratchet face 44 connected with the corresponding face formed on a member 45 of an arm 46 with which a float 47 is connected. By means of a set screw 48, the float arm and the lever arm may be adjusted to occupy any desired angle to each other. The float 47 is the device for imparting the initial operating movement to the cellar drain. The trip lever 41 is also provided with a short arm 49 projecting from the eye 40 and forming a suitable angle with the arm 42. This arm 49 is provided with lateral projections 50 and 51 provided with lugs 52 and 53.

Adjacent the eye 40 of the trip lever and also loosely mounted on the spindle 16 is the eye 33 of a lever arm 34 upon whose outer extremity is adjustably mounted a ball weight 35 which is held in place by a set screw 36. The eye 33 is loose on the spindle and the arm 34 beyond the eye passes between two lugs 37 and 38 of a trip socket 39 which is fast on the spindle 16 or connected so that the socket and the spindle rotate in unison. As shown in the drawing the spindle is made square in cross section and the trip socket is provided with an opening of corresponding shape. The lugs 37 and 38 of the trip socket are located in the path of the arm 34 so that the weighted arm actuates the trip socket whose movement in turn imparts a partial rotation to the spindle 16, whereby the valve 27 is opened and closed according to the condition of the water in the cellar to be drained. The weighted arm 34 also passes between the lugs 52 and 53 of the trip lever 41. Hence as this lever is actuated by the float, one of these lugs imparts movement to the weighted arm in one direction and the other in the opposite direction during the operation of opening and closing the valve 27.

The trip socket is held in place on the spindle by a screw 54 which enters a threaded socket formed in the outer extremity of the spindle 16. The head of this screw engages the trip socket and holds the latter in operative position.

From the foregoing description the use and operation of my improved device will be readily understood. Assuming that the valve is closed as shown in Fig. 2 of the drawing, as the water A rises in the cellar to be drained, it acts on the float 47 and moves the trip lever in the direction indicated by arrow A in Fig. 1. The lug 52 of this lever acts on the weighted arm 34 and moves the latter to the perpendicular position. Just as the weighted arm reaches this position, a shoulder 55 formed on the lug 52 of the trip socket, engages a shoulder of the lug 37 of the trip socket and slightly actuates the latter whereby a corresponding movement is imparted to the spindle 16, the crank arm 17, the stem 23 and the valve 27, in a direction to lift the valve 27 slightly from its seat. As soon as this occurs the fluid pressure (water or steam) on the valve from above is relieved and the float which up to this time has been considerably submerged in the water due to the resistance by the fluid to the opening movement of the valve, quickly rises and the lug 52 of the trip lever acts on the weighted arm 34 to throw the latter from the dead center position causing it to fall toward the left, during which movement it strikes the lug 38 of the trip socket and actuates the spindle 16 sufficiently to quickly throw the valve to the wide open position. It will be understood that this last opening movement of the valve only necessitates a slight movement of the float since this is all that is required to throw the weighted arm 34 off its balance and cause it to fall of its own weight toward the left, and act on the trip socket as heretofore explained.

Having thus described my invention, what I claim is:

1. An automatic cellar drain comprising a suction pipe, an ejector, a supply pipe and a valve for controlling the passage of fluid from the supply pipe to the ejector, and means for operating the valve comprising a float-actuated trip lever, a spindle connected in operative relation with the valve, the trip lever being loosely connected with the spindle and having a segmental part provided with separated lugs one of said lugs having two engaging parts, a weighted arm loosely mounted on the spindle and occupying a position between the lugs of the trip lever, and a trip socket fast on the spindle and provided with lugs also located on opposite sides of the trip lever, the parts being so arranged and connected that one of the lugs of the trip lever actuates the weighted arm to bring it to the perpendicular position, whereby the lower engaging part of said lug acts on one of the lugs of the trip socket to impart the initial opening movement to the valve and simultaneously imparts the overbalancing movement to the weighted arm whereby the latter falls from the perpendicular position by gravity and acts on the trip socket to suddenly complete the opening movement of the valve.

2. In an automatic cellar drain, the combination with a suction pipe, of an ejector, a fluid supply pipe, and a valve for controlling the passage of the fluid from the supply pipe to the ejector, and means for operating the said valve comprising a spindle journaled in said supply pipe and connected in operative relation with the valve, a float-actuated trip lever loosely mounted on the spindle and provided with separated lugs, a weighted arm mounted on said spindle and a trip socket fastened on the spindle and provided with lugs, one of the lugs on the trip lever adapted to first operate the weighted arm and then the trip socket, substantially as described.

In testimony whereof I affix my signature in presence of two witnesses.

GEORGE WOODALL.

Witnesses:
  CHAS. EMERY,
  ROBT. M. DAGLEISH.